US008682385B2

(12) United States Patent
Kumar et al.

(10) Patent No.: US 8,682,385 B2
(45) Date of Patent: Mar. 25, 2014

(54) MANAGING THIRD PARTY TRANSACTIONS AT A MOBILE OPERATOR

(75) Inventors: Apurva Kumar, Uttar Pradesh (IN); Sougata Mukherjea, New Delhi (IN); Venkatraman Ramakrishna, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/469,411

(22) Filed: May 11, 2012

(65) Prior Publication Data
US 2013/0303113 A1 Nov. 14, 2013

(51) Int. Cl.
*H04M 15/00* (2006.01)
(52) U.S. Cl.
USPC ......... 455/551; 455/558; 455/404.1; 340/5.8; 340/5.2; 379/114.19; 379/207.15; 379/120
(58) Field of Classification Search
USPC ........... 455/419, 461, 456.2, 445, 414.1, 551, 455/558, 560, 552.1, 417, 432.1, 410, 455/404.1, 413; 379/218.01, 91.01, 114.19, 379/216.01, 207.15, 909, 229, 243, 245, 379/88.2, 120; 380/247; 340/5.8, 5.2; 713/154
See application file for complete search history.

(56) References Cited

U.S. PATENT DOCUMENTS

| | | | | |
|---|---|---|---|---|
| 5,245,656 | A | * | 9/1993 | Loeb et al. ..................... 713/154 |
| 5,675,630 | A | * | 10/1997 | Beatty ............................ 455/551 |
| 6,058,303 | A | * | 5/2000 | Åstrom et al. ................ 455/413 |
| 7,296,290 | B2 | | 11/2007 | Barriga et al. |
| 7,849,204 | B2 | | 12/2010 | Yared et al. |
| 2001/0005840 | A1 | * | 6/2001 | Verkama ......................... 705/67 |
| 2006/0053296 | A1 | | 3/2006 | Busboom et al. |
| 2007/0295803 | A1 | * | 12/2007 | Levine et al. ................ 235/379 |
| 2008/0208762 | A1 | | 8/2008 | Arthur et al. |
| 2009/0022301 | A1 | | 1/2009 | Mudaliar |
| 2009/0253399 | A1 | * | 10/2009 | Snapp ........................ 455/404.1 |
| 2009/0305667 | A1 | | 12/2009 | Schultz |
| 2010/0022267 | A1 | * | 1/2010 | Hossain et al. ............... 455/551 |
| 2012/0124676 | A1 | * | 5/2012 | Griffin et al. .................... 726/28 |
| 2012/0178500 | A1 | * | 7/2012 | Hwang ......................... 455/558 |

OTHER PUBLICATIONS

Jendricke, Uwe, et al., "Mobile Identity Management", Workshop on Security in Ubiquitous Computing, 2002, 8 pages, Institute of Computer Science and Social Studies, Freiburg, Germany.

\* cited by examiner

*Primary Examiner* — Mahendra Patel
(74) *Attorney, Agent, or Firm* — Ference & Associates LLC

(57) ABSTRACT

Methods and arrangements for managing mobile transactions. A mobile number of a customer is registered with a mobile telephone network operator. An alternate mobile number is assigned to the customer, and the mobile number is associated with the alternate mobile number. The alternate mobile number is employed in communication between the customer and a service provider.

20 Claims, 8 Drawing Sheets

MANAGING THIRD PARTY TRANSACTIONS AT A MOBILE OPERATOR

BACKGROUND

Generally, service providers seek to link a customer's identity with unique identifiers, e.g., telephone numbers and email addresses, to facilitate communication with the customer. The service provider could be a hospital, bank, cable/dish TV operator, social network, content and gaming service provider, utility company, etc. Since mobile phone penetration across world economies has become so high, and given the proximity of mobile devices to customers, a registered mobile number (RMN) has become an attractive medium for communicating with customers.

Service providers use RMNs for several purposes. Among these are identifying a customer, ordering new services, providing a service, sending alerts and reminders, and sending promotions. However, existing RMN arrangements suffer from several drawbacks that limit the utility of RMNs in several ways. Among such drawbacks are: unreliability (e.g., the maintenance of updated information is up to the customer, who may neglect or forget such tasks at critical times); cumbersome logistics within a family having multiple phone connections; misuse of a customer's mobile number involving unsolicited communication by third parties; the lack of a complete service view of the customer; lack of verification of the registered number; inability to accommodate multiple customers with respect to one user; inability to exploit multiple communication channels (such as email and social networks) to reach a customer; and an overly limited role for an operator in aiming to mediate between a customer and a service provider.

BRIEF SUMMARY

In summary, one aspect of the invention provides a method comprising: registering a mobile number of a customer with a mobile telephone network operator; assigning an alternate mobile number to the customer; associating the mobile number with the alternate mobile number; and employing the alternate mobile number for communications between the customer and a service provider.

Another aspect of the invention provides a computer program product comprising: a computer readable storage medium having computer readable program code embodied therewith, the computer readable program code comprising: computer readable program code configured to register a mobile number of a customer with a mobile telephone network operator; computer readable program code configured to assign an alternate mobile number to the customer; and computer readable program code configured to employ the alternate mobile number in communication between the customer and a service provider.

An additional aspect of the invention provides a method comprising: registering a mobile number with a mobile telephone network operator; receiving an assigned alternate mobile number that is associated with the mobile number with the alternate mobile number; and employing the alternate mobile number for communications with a service provider.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
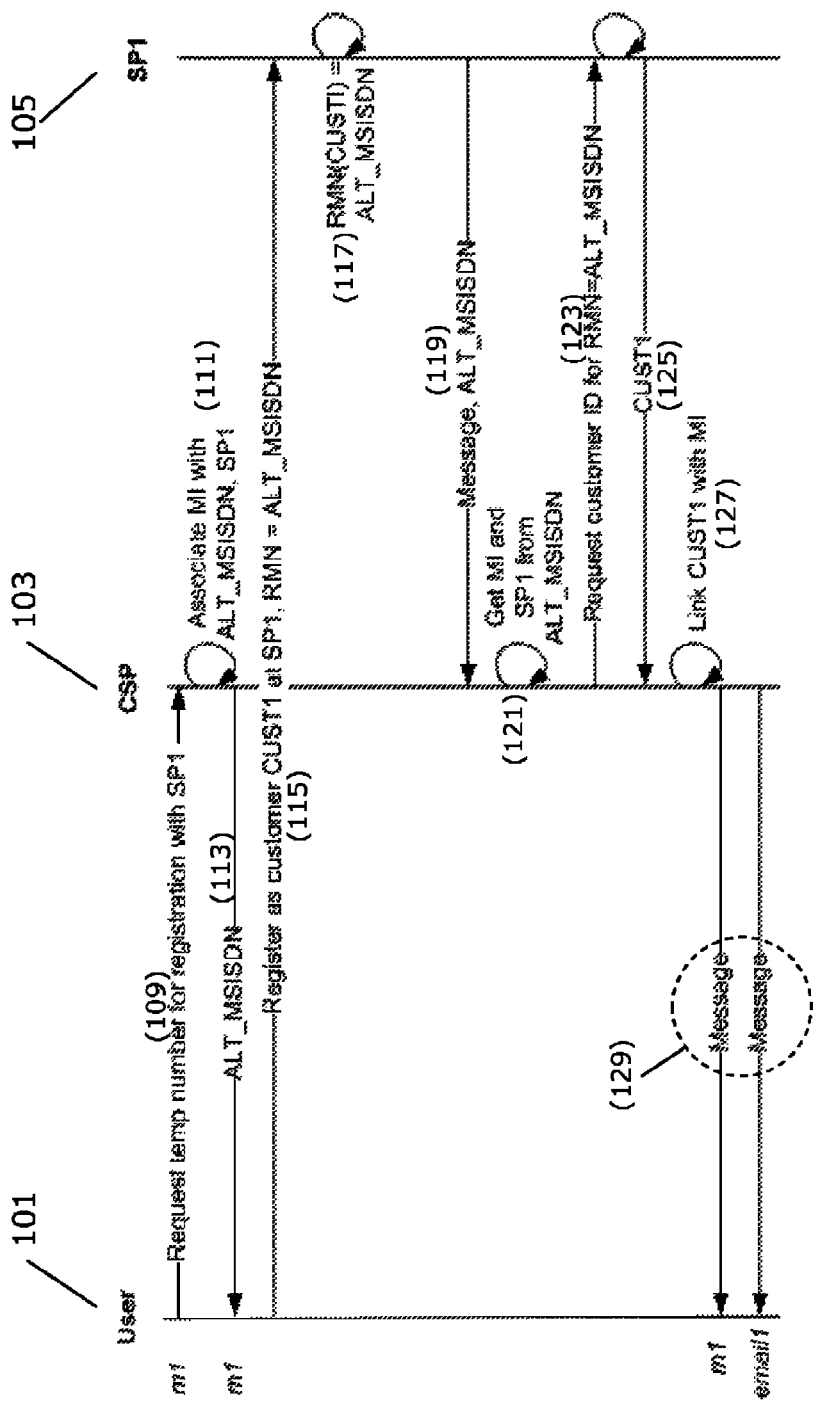
FIG. 1 schematically illustrates registration of a modified registered mobile number.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-6. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 8. In accordance with an example embodiment, most if not all of the process steps, components and outputs discussed with respect to FIGS. 1-6 can be performed or utilized by way of a processing unit or units and system memory such as those indicated, respectively, at 16' and 28' in FIG. 8, whether on a server computer, a client computer, a node computer in a distributed network, or any combination thereof.

Figure 4:
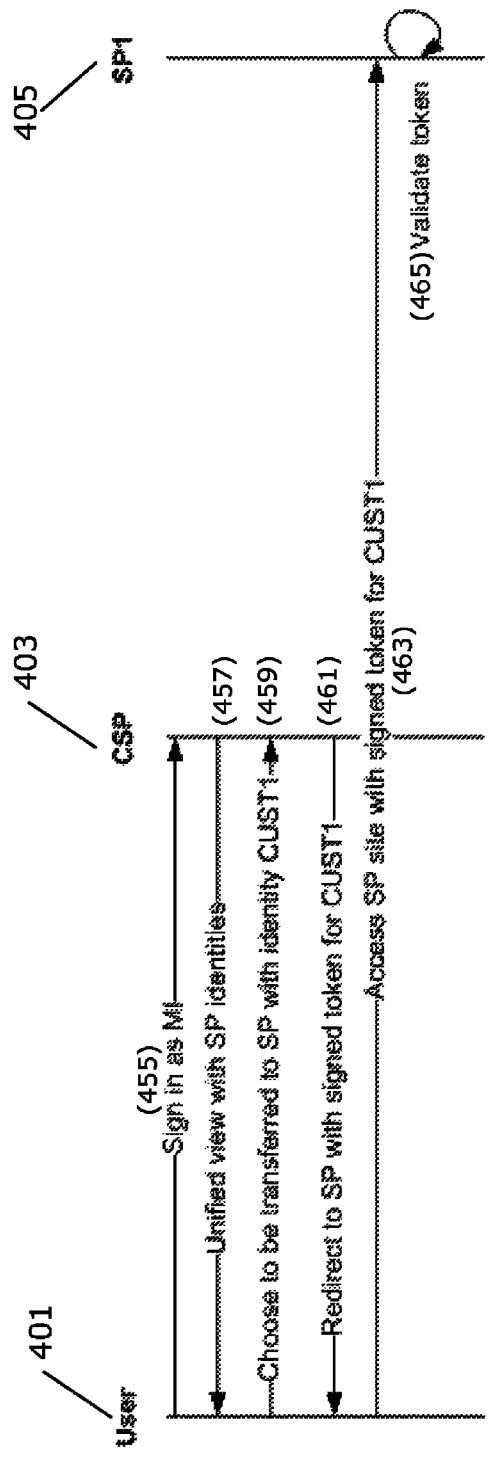
FIG. 4 schematically illustrates sign-on with identity selection.
Figure 5:
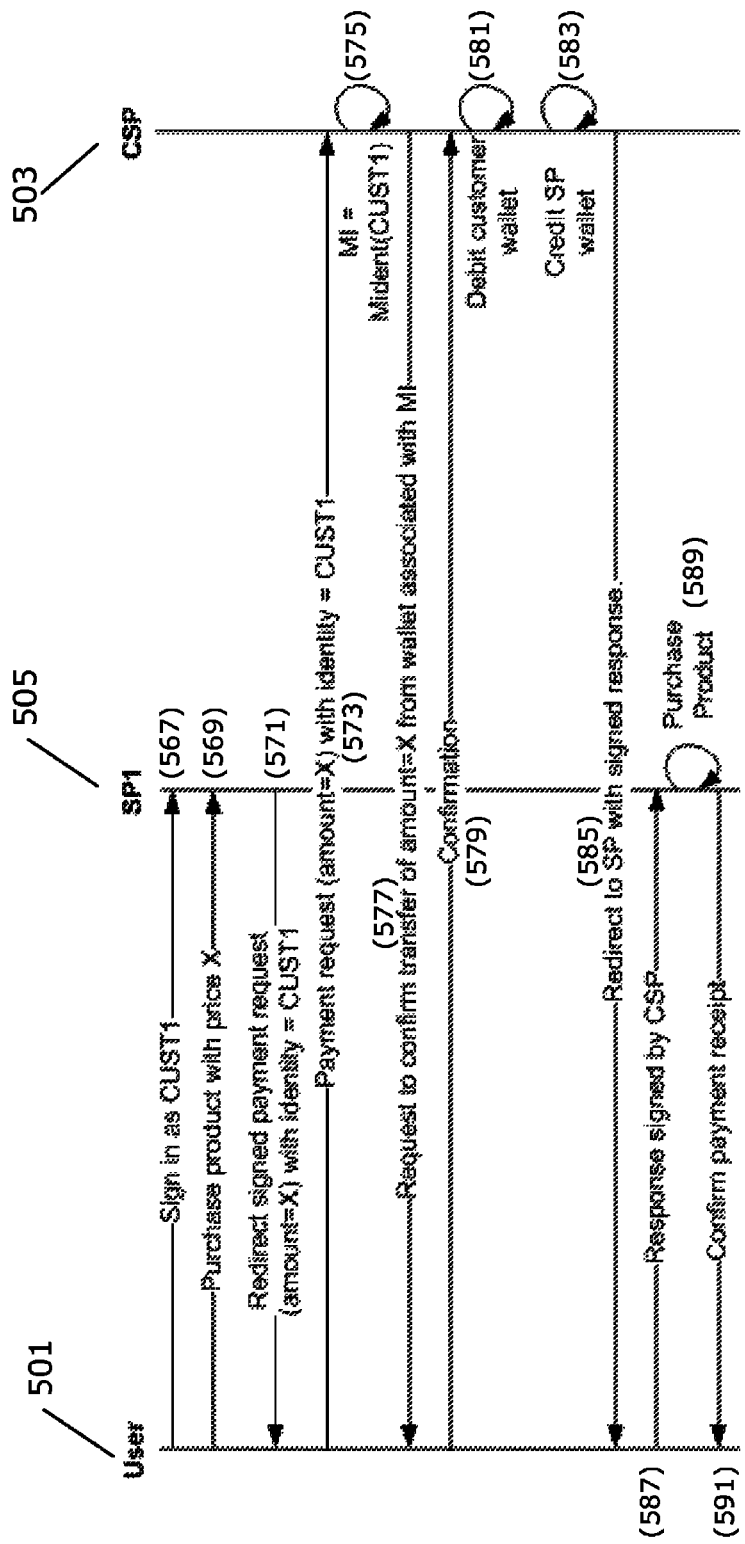
FIG. 5 schematically illustrates simplified mobile payments.
Figure 6:
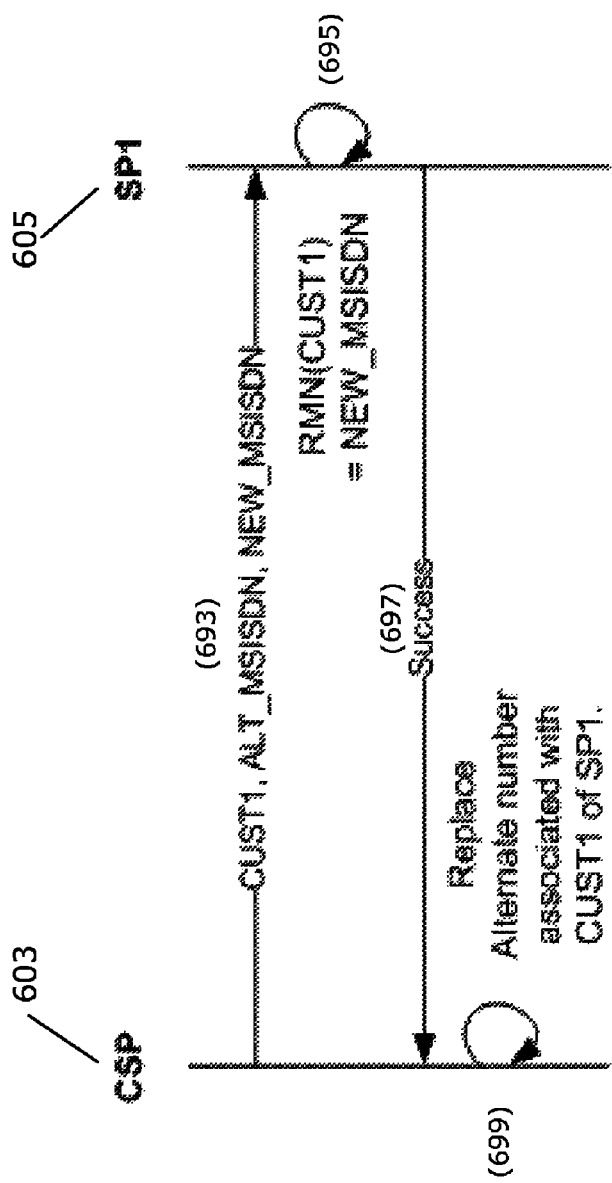
FIG. 6 schematically illustrates updating a mobile number.

To facilitate easier reference, in advancing from FIG. 1 to and through FIG. 6, a reference numeral is advanced by a multiple of 100 in indicating a substantially similar or analogous component or element with respect to at least one component or element found in at least one earlier figure among FIGS. 1-6.

Broadly contemplated herein, in accordance with at least one embodiment of the invention, is a mobile number registration process, in which a mobile operator is made aware of a link between a mobile identity and a service provider identity. Involved is a mobile number registration process that does not require sharing a customer's mobile number with the service provider. Instead, an alternate, currently unused mobile number is assigned to be used for communication between customer and the service provider.

In accordance with at least one embodiment of the invention, users are able to link multiple phone numbers to a mobile identity so that any of the numbers can be treated as registered. Also facilitated is the linking of a mobile identity with email addresses and social network IDs to further facilitate communication between a customer and his/her service providers. Users are also able to choose a type of communication (e.g., alerts, reminders, promotions, authorizations, orders, etc.) that they wish to receive from or send to service providers using each communication end-point (phones, email IDs, social network IDs, etc.).

In accordance with at least one embodiment of the invention, there is provided a manner to ensure that the linking between mobile identity and service provider identity is validated. Also provided is a manner of ensuring that an alternate number shared with the service provider cannot be used by other parties for sending unsolicited communication. Further facilitated is a variation of a typical single-sign-on flow, where an identity provider allows the user to select one of multiple identities it has with the service provider to be asserted. Additionally, there can be applied a manner of control over the service provider numbers by way of sending messages to and/or calling the customer using the alternate number.

In accordance with at least one embodiment of the invention, it will be appreciated that several advantages are enjoyed. For one, since a customer is not required to share a real mobile number with a service provider, the possibility is eliminated of the number being passed on to third parties that may use it for unsolicited communication. Further, the customer can receive alerts, reminders, promotions, etc., from the service provider at more than one communication endpoint (e.g., at multiple phone connections, email and social network IDs). The customer can then control the type of information he wants to receive at each of the end-point. Additionally, the customer can use any phone number linked to the mobile identity to contact a customer care center and to order new services from the service provider. Moreover, a user that is registered as multiple customers at a single service provider has the option of linking a single mobile number to all customer instances. Still further, there is provided a reliable linking of a service provider identity with the mobile identity and identities of the user at other service providers, thereby simplifying and improving security in transactions that involve more than one identity.

By way of benefits to a service provider, in accordance with at least one embodiment of the invention, a service provider is able to reach a customer through multiple communication channels and connections by simply using the RMN. The service provider also benefits from a simplified transaction flow, resulting from linking of the customer identity with the mobile identity. Furthermore, the above benefits are available without any changes to the customer registration process at the service provider, or a need to handle a new type of identity.

By way of benefits to an operator, in accordance with at least one embodiment of the invention, there is provided a unified view of the customer which includes relationships with other service providers. The operator can then use this information for improved targeting. Additionally, by using reliable linking between mobile identity and service provider identities, the service provider can mediate transactions involving these identities (e.g., where a customer might be using a bank account or mobile wallet to make payment for a registered service provider). Further, a mobile operator is able to play a prominent role in business and social transactions that its customers perform online, rather than simply enabling the communication.

The disclosure now turns to a discussion of the implementation of various features in accordance with at least one embodiment of the invention. For different use cases of an RMN, there is provided herein an illustration of how a workflow is handled between customer, service provider and operator.

Generally, in accordance with at least one embodiment of the invention, a mobile operator allows its customers to register for a mobile identity. It also allows customers to associate one or more services (e.g., landline, mobility) and, optionally, billing accounts, wallets, etc., with the mobile identity. The mobile identity may be identified using a unique identifier such as OpenID (which itself is a known open standard that describes how users can be authenticated in a decentralized manner; for background purposes see, e.g., http://openid.net/). Further, the operator allows its customers to associate the mobile identity with third party service providers such as hospitals, banks, email service providers, social networks, cable TV operators, content and gaming service providers, etc. Since existing mobile registration process at service providers create the association at the service provider rather than at the mobile operator, it can be appreciated that broadly contemplated herein are changes to the mobile registration flow.

In accordance with at least one embodiment of the invention, then, two cases are illustratively contemplated herebelow. In the first case, it is assumed that the service provider is capable of handling mobile identity as a new type of identification. In the second case, the changes in registration flow are transparent to the service provider. In either case, the registration flow includes mechanisms to ensure that the mobile number of the customer is not shared with the service provider. Users can specify the type of communication they want to receive from service providers on each of the connection end-points (phone numbers, email and social network IDs, etc.) linked with their mobile identity.

In accordance with at least one embodiment of the invention, described herebelow are various mobile identity flows. There is first described a manner of linking mobile identity with service provider identity. Next, it is shown how each of the existing use cases for RMN can be implemented. There are also described, by way of illustrative example, some conceivable use cases. It should be noted that interactions shown in the use cases herein can be implemented using any of the mechanisms available with the mobile operator to communicate with the customer including, but not limited to, SMS/USSD, web/WAP portal, IVR portal, mobile application using API provided by operator, etc.

In accordance with at least one embodiment of the invention, FIG. 1 shows interaction between a user 101, operator (CSP) 103 and service provider (SP1) 105 for registering a mobile number. It is assumed here that the user is interacting through a mobile phone, m1, which is associated with the mobile identity MI. The changes in the registration process itself are transparent to the service provider. However, the service provider would need to provide a service which allows CSP 103 to look up/validate customer IDs corresponding to a mobile number.

In accordance with at least one embodiment of the invention, it can be assumed that the user 101 wishes to register (115) as customer CUST1 with SP1 105. Prior to doing so, then, instead of providing his/her real number, the user 101 requests (109) an alternate number from CSP 103. The CSP service for obtaining an alternate number could be based on SMS/USSD or use some mobile application provided by the CSP. The service 103 provides (113) an alternate number (ALT_MSISDN) to the customer and associates (111) the number with the mobile identity of the customer MI and with the service provider SP1.

In accordance with at least one embodiment of the invention, the service provider 105 records the RMN as ALT_MSISDN (117) and sends (119) the first communication using ALT_MSISDN. The CSP 103 intercepts the message/call, identifies (121) the service provider associated with the number (SP1 in this case) and invokes the lookup service provided by SP1 105 to resolve ALT_MSISDN to a customer ID, CUST1; thus CSP 103 requests the customer ID (123) from SP1 (105) and then receives it therefrom (123). CSP 103 links (127) a new identity representing customer CUST1 and SP1 105 with the mobile identity MI. Finally, the communication from the service provider is passed (129) to the communication end-points of the MI which are defined by user 101 as targets for notifications (m1 and email1, in this case).

Figure 2:
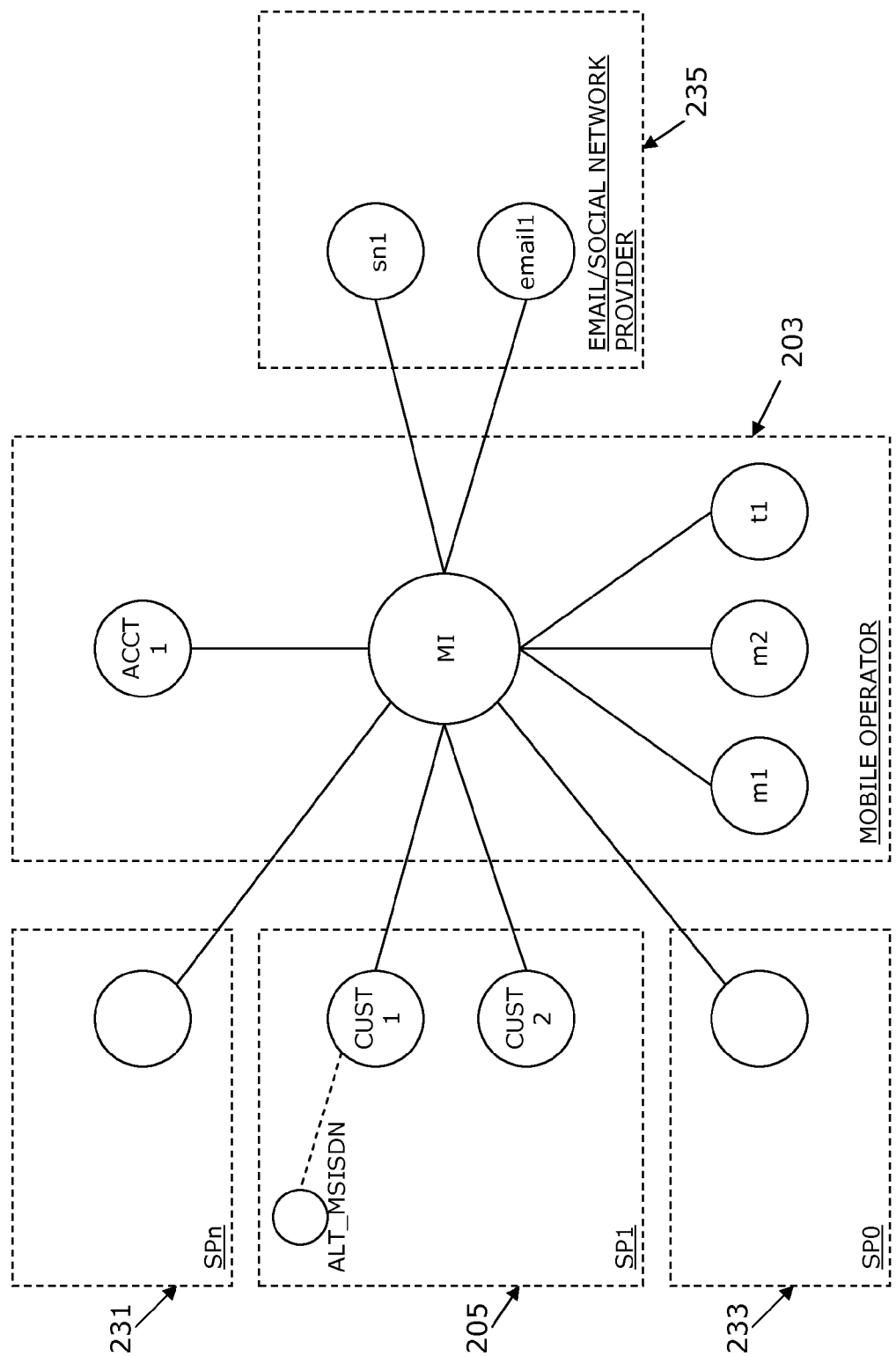
FIG. 2 schematically illustrates a sample mobile identity in communication with various entities.

In accordance with at least one embodiment of the invention, for other use cases herebelow, and as illustrated in FIG. 2, it can be assumed that a user with mobile identity MI has already linked various items such as his/her mobile numbers m1, m2, fixed line t1, mobile wallet ACCT1, etc., at mobile operator 203. The user can also be assumed to have linked two distinct identities CUST1 and CUST2 (the former of which is associated with an alternate mobile number ALT_MSISDN) at SP1 205, with MI using the registration flow described and illustrated with respect to FIG. 1. Also shown are two additional service providers 231 and 233, labeled SP0 and SPn, respectively, with which the user can be linked. Finally, the user is also assumed to have linked his/her email ID email1 and social network ID sn1, at an email and/or social network provider 235, with the MI.

Figure 3:
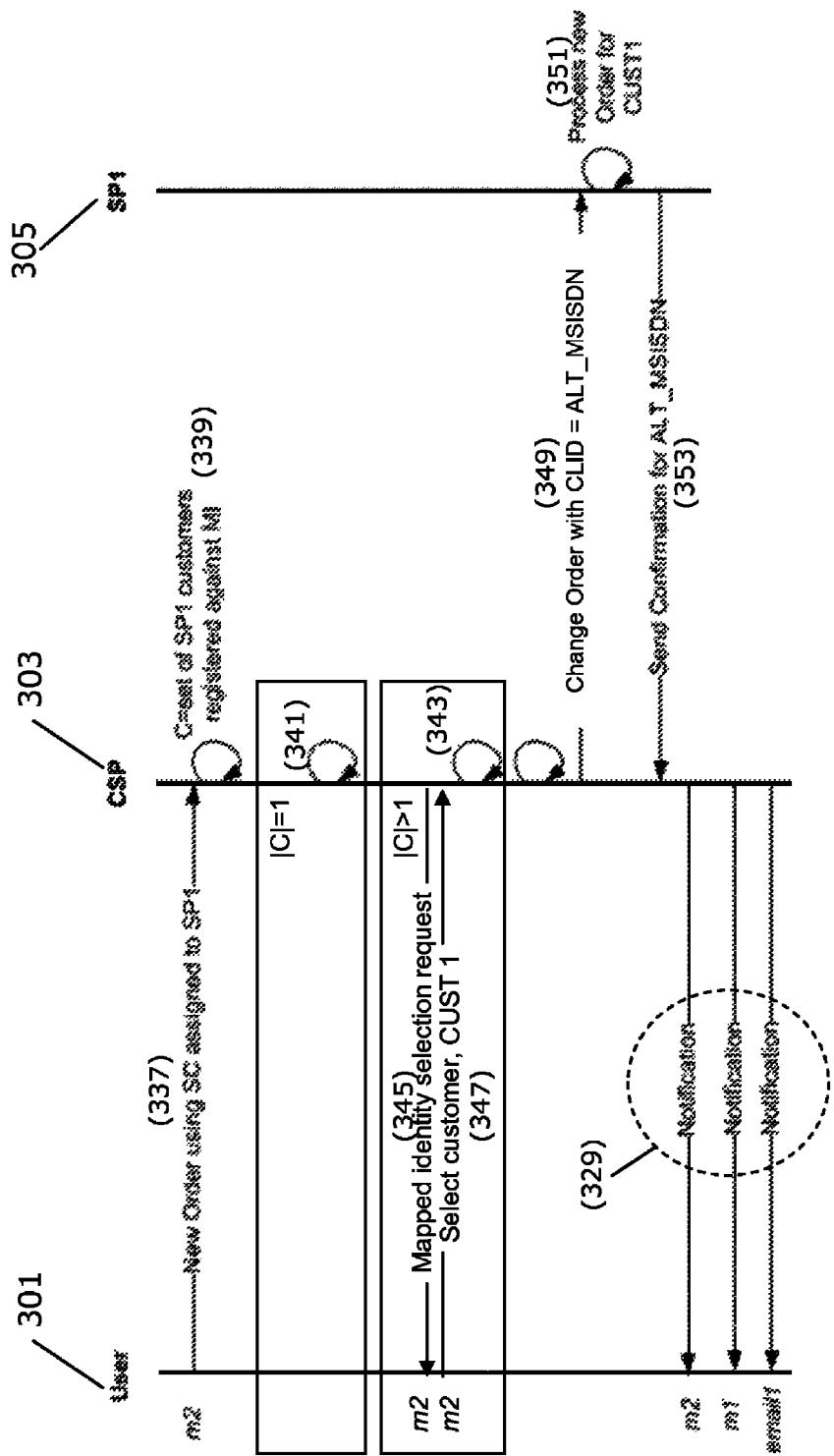
FIG. 3 schematically illustrates interaction with a service provider.

In accordance with at least one embodiment of the invention, and as shown in FIG. 3, a user 301 can use any of his/her phones (m1, m2, t1) linked with the mobile identity MI to order a new service at SP1 305. The user 301 communicates a new order (337) via sending an SMS to a specific short code (SC) or, alternatively, calling a specific number, identifying the service provider 305. The request is intercepted by CSP 303 and the phone number is mapped (341 or 343, depending on the number of customer identities, C) to the alternate number (ALT_MSISDN) associated with MI for SP1. The message/call is forwarded (349) to the service provider with calling line identification (CLID) as ALT_MSISDN. If the user has multiple customer identities at SP1 305 (i.e., if |C|>1 as shown in the drawing), he/she is prompted (345) to select (347) one of the identities as the subject of transaction prior to the mapping step (343). Once the order has been processed and service activated (351), SP1 305 sends (353) a notification message to ALT_MSISDN. The user gets respective notifications (329) via an SMS to m1, and m2, and an email to email1, confirming the activation of the new service.

In accordance with at least one embodiment of the invention, a use case as shown in FIG. 4 assumes that the CSP 403 provides a web based identity service like SAML, OpenID, etc., to third parties, and SP1 405 is a "relying party" which trusts the identity verified by CSP 403. Involved here is a mapping of the identity at CSP to an identity that can be asserted at SP1 based on user input. The mapping is based on the linking between mobile identity and service provider identity established during registration.

In accordance with at least one embodiment of the invention, then, as shown in FIG. 4, the user 401 signs in (455) as MI at the CSP portal and is presented (457) with a list of service providers with which it has relationships. Here, under each service provider, it sees a list of customer identities it has with that provider. The user 401 chooses (459) one of the customer IDs (CUST1) and is redirected (461) to the SP1 405 and gains access (463) thereto with a token signed by CSP 403, which token identifies the user 401 to be CUST1. The token is validated (465) by SP1 405 inasmuch as user 401 has presented to SP1 405 with a pre-authenticated identity of CUST1.

In accordance with at least one embodiment of the invention, a use case as shown in FIG. 5 describes how a payment process can be simplified through a use of mobile identity. A user 501 signs in (567) at the service provider (SP1) 505 and purchases (569) a product with price X and, in so doing, chooses its mobile wallet at CSP 503 as the payment option. The user is redirected (571) to request (573) of CSP 503 a charging of an amount X. Unlike a typical online payment, however, the identity of the customer CUST1 (signed by SP1 505) is also passed along with the request here. CSP 503 validates the signature and thereupon identifies (575) the mobile identity corresponding to CUST1. (More particularly, "identifying" here involves looking up a mobile identity that is associated with CUST1.) The user 501 is not required to sign in at CSP 503, and accordingly is only requested (577) to confirm (579) the payment. Once the payment is confirmed, the mobile wallet of the customer is debited (581) and the wallet of SP1 503 (or a separate bank account) is credited (583). The user 501 is redirected (585) to respond (587) to SP1 505 with a confirmation from CSP 503. SP1 505 provisions and activates the service (589), thereby effecting purchase of the service or product in question, and confirms (591) this to the customer (or user) 501.

In accordance with at least one embodiment of the invention, a use case of validation and remapping is broadly contemplated. Essentially, it may happen that a CSP has to ensure that identities linked through the mobile identity have not become invalid and are still in use. CSP has complete information about service status of phone numbers of the customer and any status changes can be immediately reflected in the mobile identity. To ensure that the third party identities have not been revoked, the CSP can periodically call the look up service provided by service provider (see, e.g., the example of FIG. 1) to validate that the mapping between the alternate number and customer ID has properly been executed.

Further, in accordance with at least one embodiment of the invention, with regard to remapping, it can be noted that the example of FIG. 1 involved the real mobile number of a customer being substituted with an alternate number while registering the mobile at a third party service provider. This protects the user from unsolicited messages and calls in the event of the service provider sharing this number with other parties. However, to completely resolve this problem, a mobile operator can ensure that this number is being used only by the service provider for communicating with the customer. In some cases it might be difficult to know the list of phone numbers used by the service provider and its representatives. Moreover, checking whether the calling number belongs to a list of allowed numbers could be expensive.

In accordance with at least one embodiment of the invention, a method as shown in FIG. 6 can obviate the need for restricting access to an alternate number of the customer to a specific service provider. This obviation is based on the mobile operator being able to change the RMN at the service provider. This could be done on a periodic basis to reduce the possibility of misuse due to sharing of the number with other parties, or could be performed based on customer complaint.

Accordingly, in accordance with at least one embodiment of the invention as shown in FIG. 6, a request for changing an RMN sent (693) by mobile operator 603 to a service provider 605 could include the old RMN to ensure that mobile operator can change only those RMNs of which it already has knowledge (e.g., its own customers). If (695) the customer ID and old alternate number match the existing record at service provider 605, it allows the change and returns a "success" response (697) to the mobile operator 603. The mobile operator 603 can then update (699) the alternate number associated with the customer ID.

Figure 7:
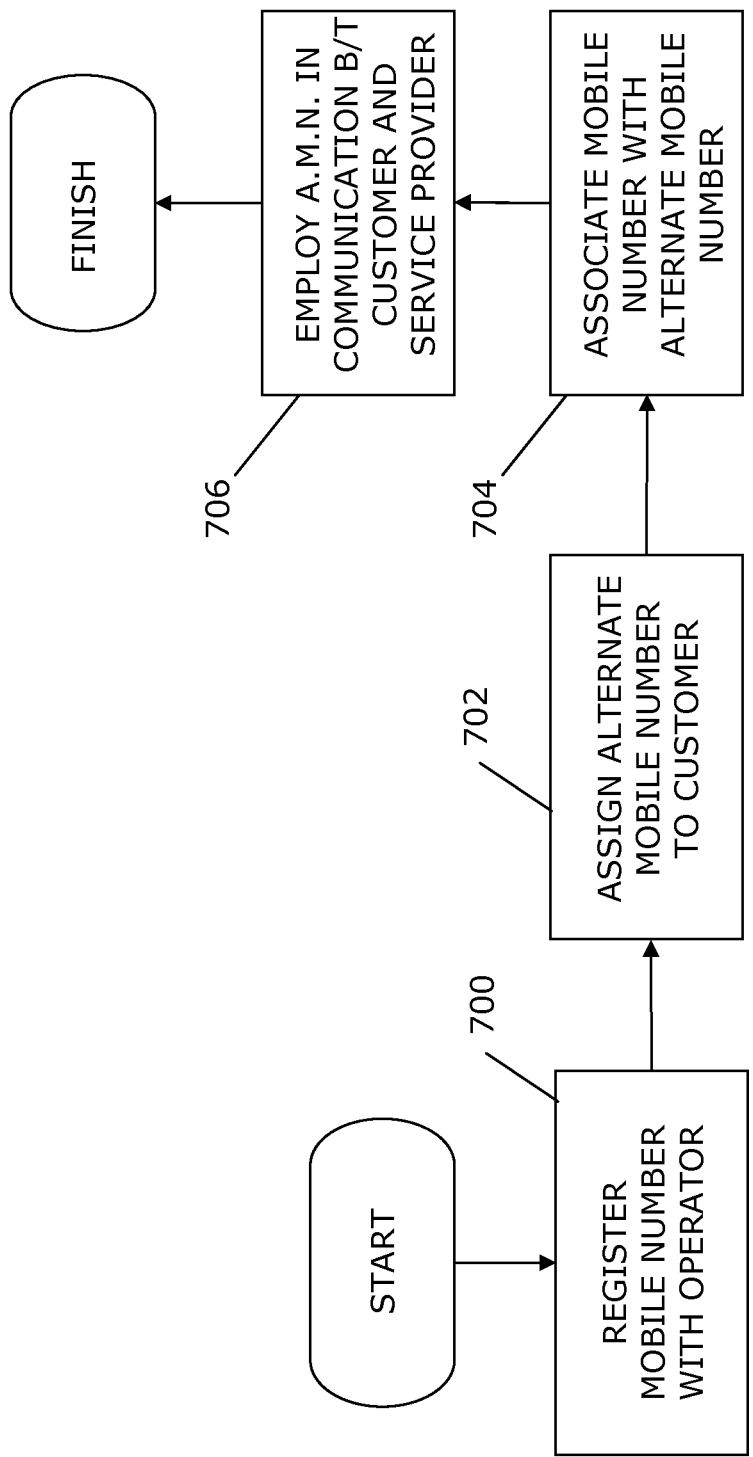
FIG. 7 sets forth a process more generally for managing mobile transactions.

FIG. 7 sets forth a process more generally for managing mobile transactions, in accordance with at least one embodiment of the invention. It should be appreciated that a process such as that broadly illustrated in FIG. 7 can be carried out on essentially any suitable computer system or set of computer systems, which may, by way of an illustrative and on-restrictive example, include a system such as that indicated at 12' in FIG. 8. In accordance with an example embodiment, most if not all of the process steps discussed with respect to FIG. 7 can be performed by way a processing unit or units and system memory such as those indicated, respectively, at 16' and 28' in FIG. 8.

As shown in FIG. 7, in accordance with at least one embodiment of the invention, a mobile number of a customer is registered at a mobile telephone network operator (700). An alternate mobile number is assigned to the customer (702), and the mobile number is associated with the alternate mobile number (704). The alternate mobile number is employed in communication between the customer and a service provider (706).

Figure 8:
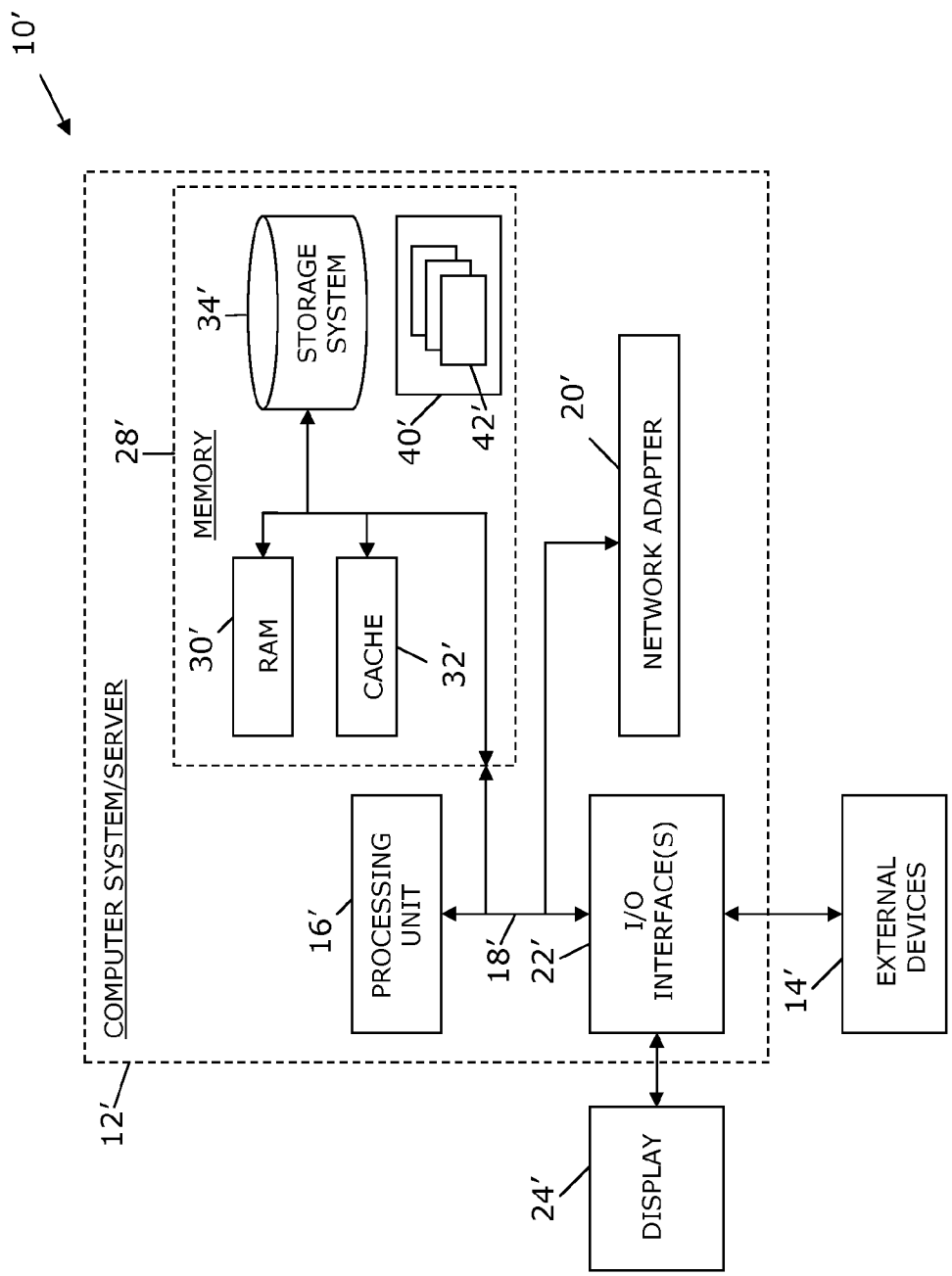
FIG. 8 illustrates a computer system.

Referring now to FIG. 8, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium (an article of manufacture) implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of managing mobile transactions at a mobile telephone network operator, comprising:
   registering a mobile number of a customer with a mobile telephone network operator;
   assigning an alternate mobile number to the customer;
   linking the mobile number with the alternate mobile number; and
   employing the alternate mobile number for communications between the customer and a service provider;
   wherein said employing comprises communicating with the mobile telephone network operator to serve as a communicative intermediary between the customer and the service provider;
   wherein said communicating comprises employing the mobile telephone network mobile telephone network operator for at least one of: providing a web single sign-on service; and simplifying an electronic payment; and
   wherein said employing of the mobile telephone network operator for providing said web single sign-on service comprises at least one member selected from the group consisting of: using an association between customer identities stored at the mobile telephone network operator and at the service provider to provide for seamless communications transfer of the customer from the mobile telephone network operator to the service provider, the transfer including a communication of customer credentials; and providing mapping to one of at least two customer identities stored at the service provider via requesting the customer to choose from a list of available customer identities.

2. The method according to claim 1, wherein the alternate mobile number is a currently unused mobile number.

3. The method according to claim 1, comprising linking at least one additional customer identifier to the alternate mobile number.

4. The method according to claim 3, wherein the at least one additional customer identifier comprises at least one member selected from the group consisting of: another mobile number; a landline number; an email account; a social network account; a mobile phone wallet; and a web account.

5. The method according to claim 1, wherein said employing comprises ascertaining the customer's identity with the service provider via the alternate mobile number.

6. The method according to claim 1, wherein said employing comprises restricting use of the alternate mobile number solely to the customer.

7. The method according to claim 6, comprising:
   establishing the identity of the service provider at the mobile telephone network operator; and
   said restricting comprising restricting use of the alternate mobile number solely to communications between the customer and the service provider.

8. The method according to claim 1, further comprising restricting use of the issued alternate number to at least one of: a predetermined time period; and a one-time use.

9. The method according to claim 1, comprising changing the alternate mobile number via at least one of: automatically after a predetermined time period; and responsive to a request from the customer.

10. The method according to claim 1, wherein said assigning comprises associating at least two customer identities, at a single service provider, with the alternate mobile number.

11. The method according to claim 1, wherein said employing of the mobile telephone network operator for simplifying an electronic payment comprises mapping customer identity at the service provider to at least one member selected from the group consisting of: a mobile wallet; and a bank account.

12. The method according to claim 1, wherein said employing comprises automatically concealing the mobile number of the customer from the service provider.

13. The method according to claim 1, wherein said employing comprises concealing the mobile number of the customer from the service provider.

14. A computer program product comprising:
   a non-transitory computer readable storage medium having computer readable program code embodied therewith, the computer readable program code comprising:
   computer readable program code configured to register a mobile number of a customer with a mobile telephone network operator;
   computer readable program code configured to assign an alternate mobile number to the customer; and
   computer readable program code configured to employ the alternate mobile number in communication between the customer and a service provider;
   wherein said computer readable program code is configured to:
   communicate with the mobile telephone network operator to serve as a communicative intermediary between the customer and the service provider; and
   employ the mobile telephone network mobile telephone network operator for at least one of: providing a web single sign-on service; and simplifying an electronic payment; and
   wherein to employ the mobile telephone network operator for providing said web single sign-on service comprises at least one member selected from the group consisting of: using an association between customer identities stored at the mobile telephone network operator and at the service provider to provide for seamless communications transfer of the customer from the mobile telephone network operator to the service provider, the transfer including a communication of customer credentials; and providing mapping to one of at least two customer identities stored at the service provider via requesting the customer to choose from a list of available customer identities.

15. The computer program product according to claim 14, wherein the alternate mobile number is a currently unused mobile number.

16. The computer program product according to claim 14, comprising computer readable program code configured to link at least one additional customer identifier to the alternate mobile number.

17. A method comprising:
registering a mobile number with a mobile telephone network operator;
receiving an assigned alternate mobile number that is associated with the mobile number with the alternate mobile number; and
employing the alternate mobile number for communications with a service provider;
wherein said employing comprises communicating with the mobile telephone network operator to serve as a communicative intermediary between a customer and the service provider;
wherein said communicating comprises employing the mobile telephone network mobile telephone network operator for at least one of: providing a web single sign-on service; and simplifying an electronic payment; and
wherein said employing of the mobile telephone network operator for providing said web single sign-on service comprises at least one member selected from the group consisting of: using an association between customer identities stored at the mobile telephone network operator and at the service provider to provide for seamless communications transfer of the customer from the mobile telephone network operator to the service provider, the transfer including a communication of customer credentials; and providing mapping to one of at least two customer identities stored at the service provider via requesting the customer to choose from a list of available customer identities.

18. The method according to claim 17, wherein the alternate mobile number is a currently unused mobile number.

19. The method according to claim 17, comprising linking at least one additional customer identifier to the alternate mobile number.

20. The method according to claim 17, wherein at least two customer identities are associated with the alternate mobile number.

* * * * *